United States Patent
Kaisko et al.

(10) Patent No.: US 8,349,055 B2
(45) Date of Patent: Jan. 8, 2013

(54) METHOD AND SCRUBBER FOR SCRUBBING FLUE GAS FLOWS

(75) Inventors: Pekka Kaisko, Pälkäne (FI); Heikki Airikkala, Tampere (FI); Tarja Korhonen, Ylöjärvi (FI); Seppo Tuominiemi, Pirkkala (FI)

(73) Assignee: Metso Power Oy, Tampere (FI)

( * ) Notice: Subject to any disclaimer, the term of this patent is extended or adjusted under 35 U.S.C. 154(b) by 879 days.

(21) Appl. No.: 11/665,034

(22) PCT Filed: Oct. 31, 2005

(86) PCT No.: PCT/FI2005/050383
§ 371 (c)(1),
(2), (4) Date: Oct. 16, 2008

(87) PCT Pub. No.: WO2006/048506
PCT Pub. Date: May 11, 2006

(65) Prior Publication Data
US 2009/0049986 A1 Feb. 26, 2009

(30) Foreign Application Priority Data
Nov. 1, 2004 (FI) .................... 20045413

(51) Int. Cl.
*B01D 53/14* (2006.01)
(52) U.S. Cl. ............... 95/149; 95/211; 96/243; 96/290
(58) Field of Classification Search ............. 95/211, 95/230; 96/243
See application file for complete search history.

(56) References Cited

U.S. PATENT DOCUMENTS

| 3,186,164 | A | * | 6/1965 | Dolfi, Sr. ............... 60/280 |
| 4,147,134 | A | * | 4/1979 | Vogt et al. ............. 122/5 |
| 5,106,544 | A | * | 4/1992 | Lee et al. ............. 261/79.2 |
| 5,178,653 | A | * | 1/1993 | Lilja et al. ............ 96/312 |
| 5,250,267 | A |   | 10/1993 | Johnson et al. |
| 5,558,818 | A | * | 9/1996 | Gohara et al. ......... 261/17 |
| 5,656,046 | A | * | 8/1997 | Gohara et al. ......... 96/273 |
| 2008/0098891 | A1 | * | 5/2008 | Feher et al. .......... 95/214 |

FOREIGN PATENT DOCUMENTS

| DE | 1 213 671 | | 3/1966 |
| DE | 100 58 548 C1 | | 10/2001 |
| DE | 1058548 C1 | * | 10/2001 |
| DE | 10058548 C1 | * | 10/2001 |
| DE | 200001058548 | * | 10/2001 |

(Continued)

OTHER PUBLICATIONS

Search Report dated Sep. 16, 2010 from the EPO in respect of counterpart EP Application No. 05799223.2.

(Continued)

*Primary Examiner* — Duane Smith
*Assistant Examiner* — Ives Wu
(74) *Attorney, Agent, or Firm* — Ladas & Parry LLP

(57) ABSTRACT

A method of scrubbing flue gases of two or more diesel engines and a scrubber for scrubbing flue gases of two or more diesel engines. The scrubber (1) comprises scrubbing means (3) for scrubbing the flue gases, and conduits (4) for conveying the flue gases to said scrubbing means (3) to be scrubbed in the same scrubbing process. The different flue gas flows are arranged to be conveyed in separate conduits (4) all the way to the scrubbing means (3).

10 Claims, 3 Drawing Sheets

FOREIGN PATENT DOCUMENTS

| | | | |
|---|---|---|---|
| EP | 1 106 240 | | 6/2001 |
| FI | 87541 | | 10/1992 |
| GB | 1389285 | * | 4/1975 |
| GB | 1389285 A | | 4/1975 |
| IT | EP 1106240 | * | 6/2001 |
| SU | 1127807 A1 | | 12/1984 |
| WO | 98/32523 | | 7/1998 |
| WO | WO 98/32523 | * | 7/1998 |

OTHER PUBLICATIONS

International-type Search Report in respect of counterpart EP Application No. 05799223.2.

* cited by examiner

METHOD AND SCRUBBER FOR SCRUBBING FLUE GAS FLOWS

FIELD OF THE INVENTION

The invention relates to a method of scrubbing a flue gas flow of two or more diesel engines, in which method the flue gas flows are conveyed to scrubbing means of a scrubber, and said flue gas flows are scrubbed in said scrubbing means in the same scrubbing process.

The invention further relates to a scrubber for scrubbing a flue gas flow of two or more diesel engines, said scrubber comprising scrubbing means for scrubbing the flue gases, and flow conduits for conveying the flue gases to said scrubbing means to be scrubbed in the same scrubbing process.

BACKGROUND OF THE INVENTION

The scrubbing of exhaust gases originating from energy production, from different industrial processes and the like, is becoming an increasingly important procedure because of the ever-tightening discharge standards. Such exhaust gases include, among others, flue gases generated as the result of combustion.

Flue gas scrubbers known per se can be employed for scrubbing flue gases. A flue gas scrubber is a cleaning device that separates impurities from the flue gases by the wet method. A flue gas scrubber comprises not only an actual flue gas scrubbing part, but also often also a droplet separator. Let it be mentioned that hereinafter a flue gas scrubber will referred to as "scrubber" in the present description.

Power stations are known that comprise a plurality of different flue gas sources. An example of such a station is a diesel power station comprising a plurality of engines operating by the diesel principle. A diesel power station may produce energy for instance for the needs of an industrial establishment or a community. In such power stations, the aim in most cases is to scrub the flue gases of several different engines, preferably all the engines of the power station, in one flue gas scrubber. This being so, the flue gases are conveyed from each engine along special flue gas conduits to an inlet connection, wherein the flue gas flows come into contact with each other. The gathered flue gases are conveyed from the inlet connection to the actual scrubbing process in the scrubber. FIGS. 1a to 1c show such a scrubber.

A problem in the above-described arrangement is that when the number of engines and conduits is large, the inlet connection becomes considerably large, larger than would be necessary in view of flow dimensioning. The width of the inlet connection may be even larger than the width of the part of the scrubber containing the actual scrubbing means. It is naturally difficult to place such an inlet connection in such a manner that it does not cause lack of space around the scrubber.

A further problem is that because of the large flow surface area of the inlet connection the flow rate of the flue gas may remain so low in partial loading situations that the inlet connection is rapidly soiled. This shortens the service intervals of the scrubber thus causing extra costs.

When a power station comprises a plurality of diesel engines, typically at least one of said diesel engines is out of use by turns, for example during service. The flue gas conduit of said diesel engine is closed with a damper, so that flue gas originating from the other engines would not flow into said engine. If this happened, uncontrollable turbulent flows may be caused in the gas flow at the inlet connection. Turbulent flows may cause back flow from the side of the actual scrubber to the inlet connection. The back flow contains chemicals used in the scrubbing process of the scrubber, which are strongly corroding and spread out to the inner surfaces of the inlet connection. The inlet connection must therefore be made from a special material resistant to said chemicals, or at least its inner surface must be coated with such a material. Typically, feasible materials are extremely expensive. In addition, the processing thereof, welding, for example, is demanding and expensive. A large inlet connection requires a significant amount of said special materials, which makes said structure very expensive. A further problem is that the structure of a large inlet connection has to be reinforced with various heavy reinforcements, for instance large carrier beams, in order for its structure to become sufficiently rigid. Numerous reinforcements are not only expensive but they also complicate the fastening of insulators and other corresponding structures to the inlet connection. Should the scrubber be built on a seismic zone, the protective coefficients of the structures further increase the size of the reinforcements required.

The effect of fatiguing loads caused by operating vibrations and pressure shocks, which are typical of diesel engines, is difficult to foresee in a large input connection, particularly with a plurality of engines connected thereto. Furthermore, the movements and flexibilities, which are within allowed limits per se, caused by said vibrations, are large, which in its turn complicates the design of the inlet connection and the structures associated therewith. Still further, if an emergency cooling pipework is used, a reliable support and fastening thereof is difficult in an inlet connection making large movements. A further problem is that the dampers have to be adapted tightly to the inlet connection, which makes them difficult to service.

BRIEF DESCRIPTION OF THE INVENTION

The object of the present invention is to provide a new and improved method and scrubber for avoiding the abovementioned problems.

The method of the invention is characterized by conveying said flue gas flows separately from each other all the way to said scrubbing means.

The scrubber of the invention is further characterized in that the different flue gas flows are arranged to be conveyed in separate flow conduits all the way to the scrubbing means.

An advantage of the invention is that the fatiguing forces that the joint between the opening of the scrubber housing and an individual conduit fastened thereto is subjected to are so small that it can be reinforced with very slight reinforcement structures, in some cases no reinforcement structures are necessarily required at all. This lowers the manufacturing costs of the scrubber. In addition, the shape of the conduits can led round all the way to the scrubber housing. A round conduit is also extremely resistant to vibrations.

A further advantage is that if one or more separate conduits are closed, the gas flow in other inlet conduits is not disturbed and harmful turbulent flows or back flows cannot therefore be generated. This enables for instance a significant reduction in the use of special materials in flow conduits and a reduction in the manufacturing costs of the flow conduits and the scrubber. For example, savings of at least 50%, in some cases even more than 75% can be reached in the amount of lining material.

A still further advantage is that the dampers can be placed more easily than previously in such a manner that service spaces of a sufficient size can be arranged for them. In addition, all dampers can be identical, which reduces their manufacturing costs and simplifies the construction and service of the scrubber.

BRIEF DESCRIPTION OF THE FIGURES

The invention will be described in more detail in the attached drawings, in which FIG. 1a schematically shows a prior art scrubber as a perspective view.

In the figures, the invention is shown in a simplified manner for the sake of clarity. In the figures, like parts are denoted with the same reference numerals.

DETAILED DESCRIPTION OF THE INVENTION

Figure 1C:
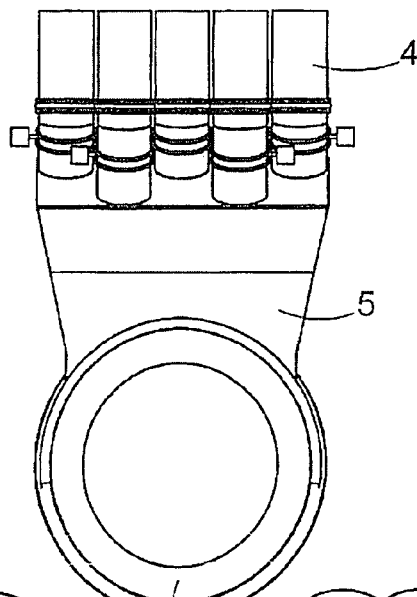
FIG. 1c shows a top view of the scrubber of FIG. 1a, FIG. 2a schematically shows a scrubber of the invention as a perspective view.
Figures 1A, 1B:
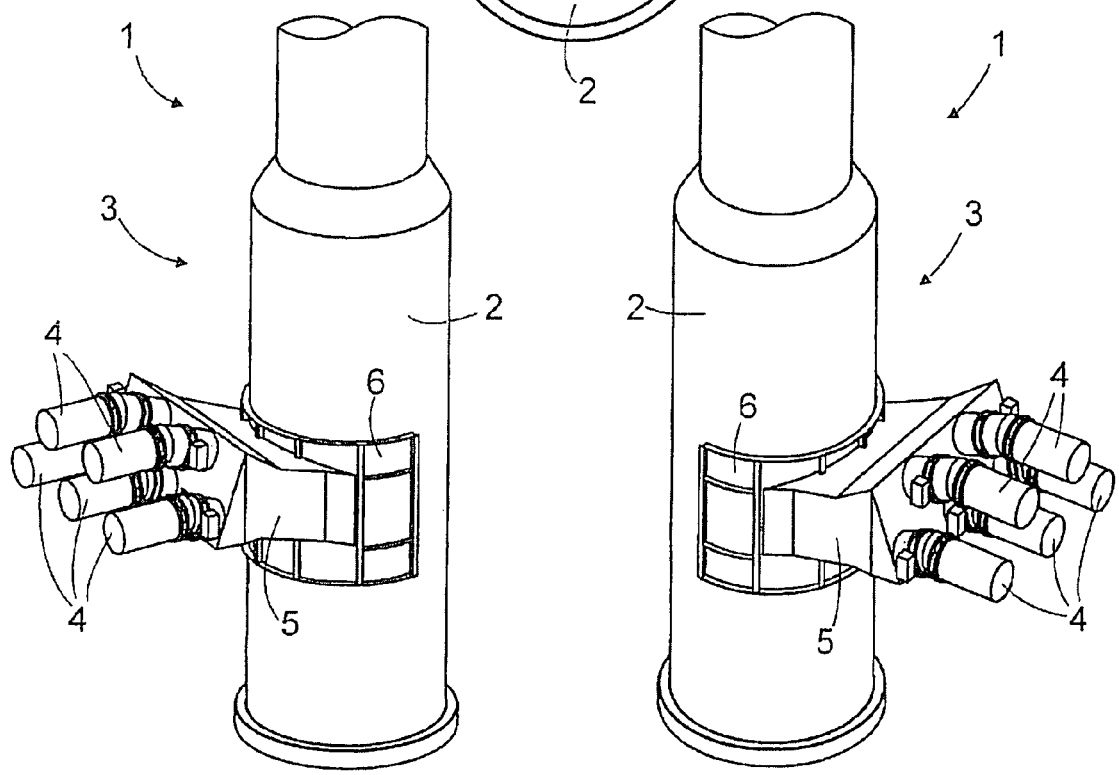
FIG. 1b shows the scrubber of FIG. 1a as a second perspective view.

FIG. 1a schematically shows a prior art scrubber as a perspective view, FIG. 1b shows the same scrubber as a second perspective view, and FIG. 1c shows a top view of the scrubber.

Scrubbing means 3 for scrubbing gases are arranged inside the outer housing 2 of the scrubber 1. The figures do not show the scrubbing means 3. The flue gases to be scrubbed are conveyed to the scrubber 1 along five flow conduits 4. A first end of each flow conduit 4 is connected to a separate diesel engine, which means that the flue gas to be scrubbed originates from five diesel engines. Let it be mentioned that the figures do not show the first end, but the conduits 4 are shown cut off.

Second ends of the flow conduits 4 are connected to an inlet connection 5, wherein the gases conveyed along the different flow conduits 4 are mixed with each other. From the inlet connection 5, the gases are conveyed to be scrubbed by the scrubbing means of the scrubber 1.

As the figure shows, the inlet connection 5 is extremely large, and takes up a considerable amount of space around the scrubber 1. In the embodiment of FIGS. 1a to 1c, the width of the inlet connection 5 is in the same order as that of the diameter of the actual scrubber housing 2. The weight of the inlet connection 5 is also considerably high. Accordingly, it has to be supported with rigidifying structures 6 that increase the manufacturing costs of the scrubber 1. Other disadvantages and problems associated with the inlet connection 5 were presented previously in the present description.

Figure 2C:
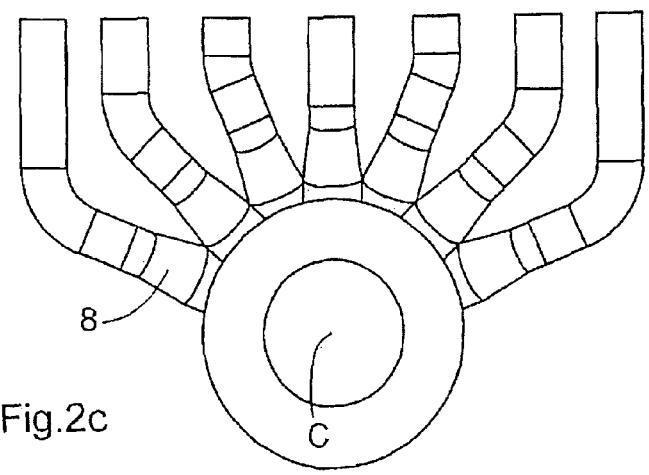
FIG. 2c shows a top view of the scrubber of FIG. 2a, and FIG. 3 schematically shows a top view of another scrubber of the invention.
Figures 2A, 2B:
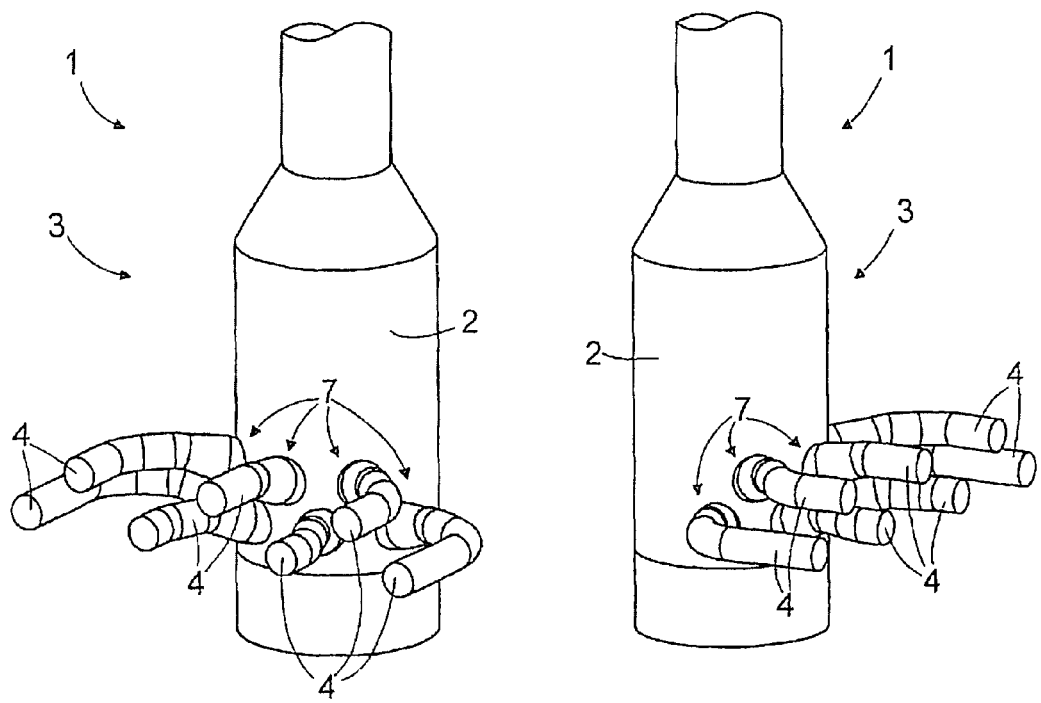
FIG. 2b shows the scrubber of FIG. 2a as a second perspective view.

FIG. 2a schematically shows a scrubber of the invention as a perspective view, FIG. 2b shown the scrubber of FIG. 2a as a second perspective view, and FIG. 2c showing a top view of the same scrubber.

The scrubber 1 of the invention comprises a housing 2, inside of which are arranged scrubbing means 3 required by the scrubbing process to be implemented in the scrubber 1, i.e. the space, means and devices required by the scrubbing process. Let it be mentioned that the figures do now show the scrubbing means 3. The scrubbing process of the scrubber 1 can be based for instance on the spray cleaning principle or the packed bed principle, a combination thereof or any other scrubbing principle for diesel flue gases known per se. In addition, the scrubber 1 may comprise a droplet separator unit to which the flue gas, flown through the scrubbing means, is conveyed.

Said principles and the scrubbers based thereon are well known per se to a person skilled in the art, and are thus not dealt with in more detail herein.

Flue gases from seven diesel engines are conveyed to the scrubber 1 shown in FIGS. 2a to 2c. Let it be mentioned that said engines are not shown in the figures. Each engine is connected to the scrubber 1 with a separate flow conduit 4, the number of flow conduits 4 thus being seven.

The flow conduit 4 serves to convey the flue gases of the engine to be scrubbed in the scrubber 1. Each flow conduit 4 is fastened via its inlet connection 7 to the housing 2 of the scrubber. This being the procedure, a heavy inlet connection for collecting the flue gases from the different flow conduits and causing the above-described problems is not required at all. The flue gases flowing in the flow conduits 4 come into contact with each other only in the actual scrubbing means 3 and in the scrubbing process implemented therewith. The flue gases are scrubbed in the same scrubbing process, i.e. the flue gases conveyed along the different flow conduits 4 to the inside of the housing 2 are scrubbed, more or less mixed with each other, with the same scrubbing means 3.

The inlet connection 7 between an individual flow conduit 4 and the housing 2 is subjected to quite slight stresses, thanks to which the inlet connection does not necessarily have to be reinforced at all with reinforcement structures; and should reinforcement structures be required, they are at most very lightweight. Since the stresses the inlet connection 7 between an individual flow conduit 4 and the housing 2 is subjected to are relatively simple to find out, the shape and strength of the reinforcement structures required can be accurately specified.

The flow conduits 4 are round up to the housing 2, thanks to which they endure vibrations and pressure impacts extremely well.

The end of the flow conduit 4 is provided with an expander cone 8 for slowing down the flow rate of the flue gas. The flow rate in the flow conduit 4 is preferably 20 to 30 m/s, whereas the flow rate in the inlet connection 7 is preferably 12 to 15 m/s. However, the expander cone 8 is not necessary, in other words, if need be, the flow conduit 4 can have a constant cross-sectional area up to the housing 2. Separate flow conduits 4 can be dimensioned for optimal flowing along their entire length from the engine up to the housing 2. Should one or even more flow conduits 4 be closed, this does not cause harmful turbulent flows or back flows caused thereby.

The shape of the housing 2 of the scrubber shown in FIGS. 2a to 2c is a round circular cylinder. The longitudinal symmetry axis of the cylinder is denoted with reference marking C. Each flow conduit 4 is arranged in the housing 2 with its tail end directed towards said symmetry axis C. This being so, the flue gas coming from the flow conduit 4 flows towards the symmetry axis C of the housing 2 and the scrubbing means arranged therein. Directed in this manner, the flue gas spreads as evenly as possible into the scrubbing means, which enhances the efficient and optimally economic scrubbing of the flue gases.

Depending on the application, the flow conduits 4 may be connected to the housing 1 of the scrubber either in the direction of the horizontal plane or directed either upwards or downwards from the horizontal plane.

The flow conduits 4 are fastened to the housing 2 either fixedly, for instance by welding, or detachably, for instance by bolt fastening, or in another manner known per se.

The flow conduits 4 convey the flue gases to be scrubbed to the scrubber 1 and the scrubbing means contained thereby to approximately the same height. In this way, the same scrubbing process is directed to the flow gas conveyed along each flow conduit 4. The flow conduits 4 can naturally be placed in another manner. It is essential in the placement of the flow conduits 4 that sufficient scrubbing is directed to the flue gas conveyed along each flow conduit 4.

The cross-sections of the flow conduits 4 are identical, i.e. the shape and dimensions of their cross-sections are identical, which simplifies the manufacture and service of the flow conduits 4.

Dampers can be arranged in the flow conduits 4. All dampers are preferably identical, thanks to which their manufacture, service and possible replacement show no differences; instead, all said measures take place at least essentially in the same way.

The flow conduits 4 are arranged in the housing 2 in such a manner that sufficiently space is reserved around them for instance for servicing the dampers. The flow conduits 4 are not led to the same inlet connection, in which they would have to be arranged tightly adjacent to each other.

The number of diesel engines, and also that of flow conduits 4, connected to the scrubber 1, depends on the application in question, and therefore said numbers can naturally be different from what is shown in FIGS. 2a to 2c.

Figure 3:
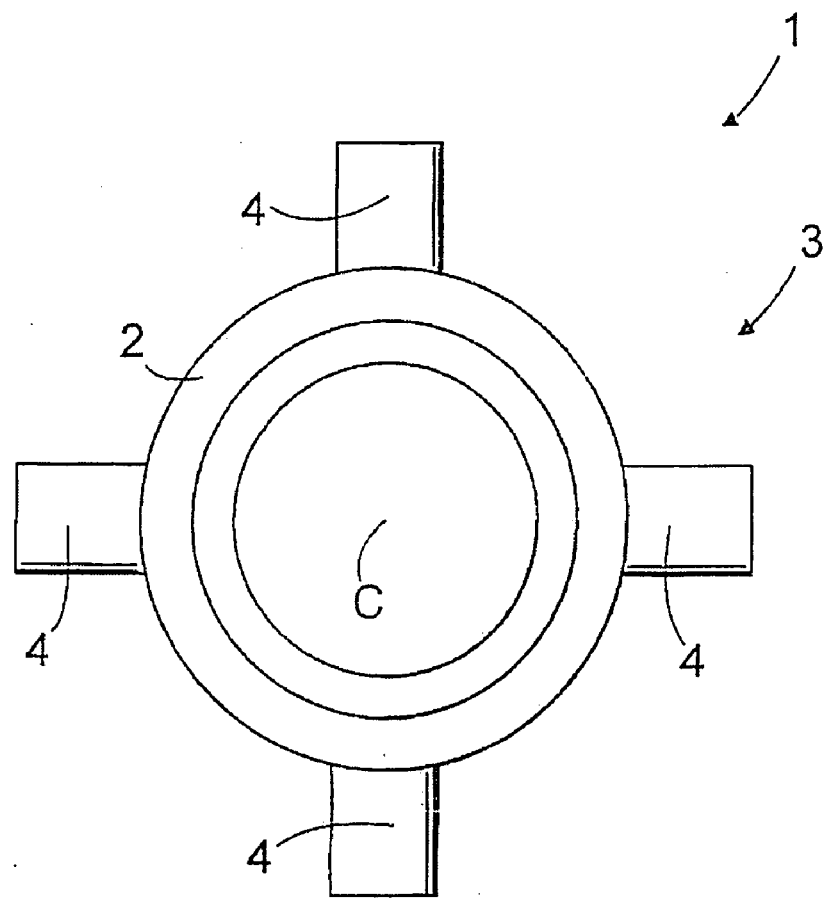

FIG. 3 shows a schematic top view of a second scrubber according to the invention.

Separate flow conduits 4 convey flue gas to be scrubbed from the diesel engines to the scrubber 1. The number of flow conduits 4 is four in this embodiment of the scrubber. The gases conveyed by the flow conduits 4 are not mixed until in the actual scrubber 1.

The inlet connections 7 of the flow conduits 4 are arranged around the circumference of the housing 2 in such a manner that they are arranged also on opposite sides of the housing 2 relative to each other. Arranged in this manner, maximally space is provided around each flow conduit 4, making the service of dampers, for instance, particularly easy and convenient. Let it be mentioned in this connection that the cross-section of the housing 2 of the scrubber does not necessarily have to be a round cylinder, but its cross-section can also be square, for example.

Since the inlet connections 7 of the flow conduits can be arranged freely around the housing 2 of the scrubber, placement of the flow conduits 4 is easier than previously even in a confined environment.

The drawings and the related description are intended only to illustrate the inventive idea. The details of the invention can vary within the scope of the claims.

The invention claimed is:

1. A method of scrubbing flue gases from a plurality of diesel engines in a single scrubber comprising a housing, the method comprising:
   conveying the flue gases from the plurality of diesel engines directly to the single scrubber through a plurality of conduits, wherein the conduits are attached separately at separate individual inlets, and
   scrubbing said flue gases in a scrubbing process such that all the flue gases conveyed to the housing are scrubbed by the same scrubbing process in the same scrubber.

2. A method as claimed in claim 1, wherein the scrubber includes a spray scrubber, a packed bed scrubber or a combination thereof.

3. A method as claimed in claim 1, wherein the scrubber housing has a symmetry axis, and the method further comprises arranging the flow conduit in the housing such that its tail end is directed towards said symmetry axis.

4. A power station comprising:
   a plurality of diesel engines generating flue gases,
   a scrubber for scrubbing the flue gases from the plurality of diesel engines, said scrubber comprising a housing for scrubbing the flue gases, and
   a plurality of flow conduits connected directly to the scrubber for conveying the flue gases to the scrubber to be scrubbed in a scrubbing process,
   wherein the flow conduits are attached separately at separate individual inlets, and
   wherein the flow conduits are each arranged to convey the flue gas of the respective diesel engine directly to the housing such that all the flue gases from the plurality of diesel engines are scrubbed by the same scrubbing process in the same scrubber.

5. A power station as claimed in claim 4, wherein the flow conduits have round cross-sections.

6. A power station as claimed in claim 4, wherein the flow conduits have identical cross-sections.

7. A power station as claimed in claim 4, wherein the scrubber is a spray scrubber, a packed bed scrubber or a combination thereof.

8. A power station as claimed in claim 4, wherein the scrubber housing has a cylindrical shape and a symmetry axis, the flow conduits being arranged in the housing such that tail ends of the flow conduits are directed towards said symmetry axis of the scrubber housing.

9. A power station as claimed in claim 4, wherein the flow conduits each have an expander cone at an end connected to the housing for slowing down a flow rate of the flue gas flowing therethrough.

10. A power station comprising:
   a plurality of diesel engines generating flue gases,
   a scrubber for scrubbing the flue gases from the plurality of diesel engines, said scrubber comprising a housing for scrubbing the flue gases, and
   a plurality of flow conduits connected directly to the scrubber for conveying the flue gases to the scrubber to be scrubbed in a scrubbing process,
   wherein the flow conduits are each arranged to convey the flue gas of the respective diesel engine directly to the housing such that all the flue gases from the plurality of diesel engines are scrubbed by the same scrubbing process in the same scrubber, and
   wherein the flow conduits each have an expander cone at an end connected to the housing for slowing down a flow rate of the flue gas flowing therethrough.

* * * * *